United States Patent
Gugel et al.

(10) Patent No.: US 11,555,532 B2
(45) Date of Patent: Jan. 17, 2023

(54) POWERSHIFT TRANSMISSION FOR AGRICULTURAL MACHINES

(71) Applicant: DEERE & COMPANY, Moline, IL (US)

(72) Inventors: Rainer Gugel, Mannheim (DE); Frank Buhrke, Mannheim (DE); David Müller, Mannheim (DE); Michael Schumann, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 219 days.

(21) Appl. No.: 16/808,035

(22) Filed: Mar. 3, 2020

(65) Prior Publication Data
US 2020/0284324 A1    Sep. 10, 2020

(30) Foreign Application Priority Data

Mar. 6, 2019  (EP) ..................... 19161074
Mar. 6, 2019  (EP) ..................... 19161083
(Continued)

(51) Int. Cl.
*F16H 3/093* (2006.01)
*F16H 59/08* (2006.01)
(Continued)

(52) U.S. Cl.
CPC ............. *F16H 3/093* (2013.01); *F16H 59/08* (2013.01); *F16H 2003/0818* (2013.01);
(Continued)

(58) Field of Classification Search
CPC ............. F16H 3/093; F16H 2003/0818; F16H 2003/0822; F16H 2003/0933; F16H 2057/02056; F16H 2200/0078
See application file for complete search history.

(56) References Cited

U.S. PATENT DOCUMENTS

| 4,063,464 A | 12/1977 | Crabb |
| 4,721,002 A * | 1/1988 | Horii ..................... F16H 37/043 |
| | | 74/360 |

(Continued)

FOREIGN PATENT DOCUMENTS

| DE | 2645907 A1 | 4/1978 |
| DE | 2847245 A1 | 5/1980 |

(Continued)

OTHER PUBLICATIONS

European Search Report issued in counterpart application No. 19161101.1 dated Sep. 13, 2019. (16 pages).

(Continued)

*Primary Examiner* — Joseph Brown

(57) ABSTRACT

A powershift transmission for an agricultural machine includes a transmission housing, an input shaft and an output shaft unit. The input shaft and the output shaft unit extend at least at a distance within the transmission housing. The transmission also includes an auxiliary shaft arranged within the transmission housing and offset between the input shaft and the output shaft unit. The input shaft and the auxiliary shaft are connected to one another via a front-mounted range unit, and the auxiliary shaft and the output shaft unit are connected to one another via a rear-mounted range unit. Each range unit includes at least two individual gear wheel pairs which are coupled or decoupled. The output shaft unit includes a main output shaft and an auxiliary output shaft coupled to one another via a reduction gear unit.

6 Claims, 4 Drawing Sheets

(30) Foreign Application Priority Data

Mar. 6, 2019 (EP) ..................................... 19161089
Mar. 6, 2019 (EP) ..................................... 19161101

(51) Int. Cl.
*F16H 3/08* (2006.01)
*F16H 57/02* (2012.01)
*F16H 61/04* (2006.01)

(52) U.S. Cl.
CPC ................ *F16H 2003/0822* (2013.01); *F16H 2003/0933* (2013.01); *F16H 2057/02056* (2013.01); *F16H 2061/0481* (2013.01); *F16H 2200/0078* (2013.01); *F16H 2200/0082* (2013.01)

(56) References Cited

U.S. PATENT DOCUMENTS

| | | | | |
|---|---|---|---|---|
| 4,777,837 A | * | 10/1988 | Lehle | F16H 3/093 74/333 |
| 4,824,128 A | | 4/1989 | Takagi et al. | |
| 5,081,878 A | | 1/1992 | Stasiuk | |
| 5,269,732 A | * | 12/1993 | Weiss | F16H 47/04 475/252 |
| 5,613,401 A | * | 3/1997 | Maurizio | F16H 59/02 74/330 |
| 6,138,528 A | * | 10/2000 | Fukumoto | F16H 61/16 74/745 |
| 9,856,973 B1 | | 1/2018 | Owen et al. | |
| 2007/0266812 A1 | * | 11/2007 | Asada | F16H 3/093 74/469 |
| 2010/0200323 A1 | * | 8/2010 | Egawa | B60K 17/00 180/252 |
| 2012/0048043 A1 | * | 3/2012 | Vu | F16H 37/043 74/331 |
| 2015/0112560 A1 | | 4/2015 | Bremner | |
| 2016/0327128 A1 | * | 11/2016 | Raisch | F16H 37/043 |
| 2018/0187760 A1 | * | 7/2018 | Pauli | F16H 3/091 |
| 2018/0372188 A1 | * | 12/2018 | Hana | F16H 37/043 |
| 2019/0063556 A1 | * | 2/2019 | Bulgrien | F16H 3/006 |
| 2020/0047601 A1 | * | 2/2020 | Park | B60K 6/547 |

FOREIGN PATENT DOCUMENTS

| | | |
|---|---|---|
| DE | 102010039349 A1 | 2/2012 |
| DE | 102011081520 A1 | 3/2012 |
| DE | 1020011080565 A1 | 2/2013 |
| DE | 102013217187 A1 | 3/2015 |
| DE | 102016208646 A1 | 11/2017 |
| DE | 102017209602 A1 | 1/2018 |
| DE | 102017212392 A1 | 1/2019 |
| EP | 0745198 B1 | 8/1998 |
| GB | 2033032 A | 5/1980 |
| WO | WO9936285 A2 | 7/1999 |
| WO | 2013064371 A1 | 5/2013 |

OTHER PUBLICATIONS

European Search Report issued in counterpart application No. 19161089.8 dated Sep. 13, 2019 (13 pages).
European Search Report issued in counterpart application No. 19161083.1 dated Sep. 13, 2019 (16 pages).
European Search Report issued in counterpart application No. 19161074.0 dated Sep. 13, 2019 (13 pages).
European Search Report issued in European Patent Application No. 19161074.0, dated Sep. 13, 2019, 27 pages.
European Search Report issued in European Patent Application No. 19161083.1, dated Sep. 13, 2019, 33 pages.
European Search Report issued in European Patent Application No. 19161089.8, dated Sep. 13, 2019, 26 pages.
European Search Report issued in European Patent Application No. 19161101.1, dated Sep. 13, 2019, 32 pages.

* cited by examiner

| Gear | Front-Mounted Range Unit | | | | Rear-Mounted Range Unit | | | | Reduction Gear Unit | |
|---|---|---|---|---|---|---|---|---|---|---|
| | I | II | III | IV | A | B | C | D | Lo | Hi |
| 1 | X | | | | X | | | | X | |
| 2 | | X | | | X | | | | X | |
| 3 | | | X | | X | | | | X | |
| 4 | | | | X | X | | | | X | |
| 5 | X | | | | | X | | | X | |
| 6 | | X | | | | X | | | X | |
| 7 | | | X | | | X | | | X | |
| 8 | | | | X | | X | | | X | |
| 9 | X | | | | | | X | | X | |
| 10 | | X | | | | | X | | X | |
| 11 | | | X | | | | X | | X | |
| 12 | | | | X | | | X | | X | |
| 13 | X | | | | | | | X | X | |
| 14 | | X | | | | | | X | X | |
| 15 | | | X | | | | | X | X | |
| 16 | | | | X | | | | X | X | |
| 17 | X | | | | X | | | | | X |
| 18 | | X | | | X | | | | | X |
| 19 | | | X | | X | | | | | X |
| 20 | | | | X | X | | | | | X |
| 21 | X | | | | | X | | | | X |
| 22 | | X | | | | X | | | | X |
| 23 | | | X | | | X | | | | X |
| 24 | | | | X | | X | | | | X |
| 25 | X | | | | | | X | | | X |
| 26 | | X | | | | | X | | | X |
| 27 | | | X | | | | X | | | X |
| 28 | | | | X | | | X | | | X |
| 29 | X | | | | | | | X | | X |
| 30 | | X | | | | | | X | | X |
| 31 | | | X | | | | | X | | X |
| 32 | | | | X | | | | X | | X |

FIG. 4

POWERSHIFT TRANSMISSION FOR AGRICULTURAL MACHINES

RELATED APPLICATIONS

This application claims priority to European Patent Application Ser. No. 19161101.1, filed Mar. 6, 2019, European Patent Application Ser. No. 19161089.8, filed Mar. 6, 2019, European Patent Application Ser. No. 19161083.1, filed Mar. 6, 2019, and European Patent Application Ser. No. 19161074.0, filed Mar. 6, 2019, the disclosures of which are hereby incorporated by reference in their entirety.

FIELD OF THE DISCLOSURE

The present disclosure relates to a powershift transmission, and in particular to a powershift transmission for an agricultural machine.

BACKGROUND

Powershift transmissions are a special form of a vehicle transmission in which the transmission ratio can be changed under load, i.e., during travel, without interrupting the torque. As a result, propulsion forces can be transmitted even during the shifting operation so the vehicle can continue to accelerate even during the shifting operation. Therefore, no decreases in comfort occur during the shifting operation. In agricultural utility vehicles, particularly in tractors, powershift transmissions are mainly used because they permit faster work, in particular when working on hilly terrain and on changing types of soil, and help to save fuel. Some tractor transmissions can also only be partially power shifted, which means that shifting without an interruption in the tractive force can only be performed between some of the gears, while other gears (for example, a group change) are associated with an interruption in the tractive force.

It is known to form such transmissions in conjunction with planetary gear mechanisms and clutches in a modular system, so that by virtue of a corresponding design and arrangement of gear wheel pairs of the planetary gear mechanism the powershift transmission can be operated in various operating modes, such as a through-connected drive mode, gear reduction mode and reversing mode. Therefore, on tractors, powershift transmissions are used as a pre-stage transmission which, depending on the design of a multi-step planetary set, can either be operated in the through-connected drive mode or reversing mode operating modes or in the through-connected drive mode or gear reduction mode operating modes.

These transmissions are characterized by the fact that in a first shift operation a clutch which is connected to an input shaft connects the input shaft to the output shaft, so that the transmission can be operated in the through-connected drive mode, wherein the planetary gear mechanism turns freely. In a second shift operation, the clutch is released so that the planetary carrier is driven by the input shaft and the planetary set revolves around a first sun gear which is fixed in place by a brake through which the output shaft extends. The power output occurs via a second sun gear which is connected to the output shaft and is driven by the planetary set. Depending on the assignment of the planetary set and the design of the gear sets of planetary set and sun gears, the powershift transmission may be operated in gear reduction mode or in reversing mode.

Therefore, a two-stage powershift transmission is made available which is, however, on the one hand, costly in terms of fabrication technology and, on the other hand, does not permit a further operating mode, for example, a crawling speed mode in the specified arrangement.

EP 0 745 198 B1 describes a powershift transmission for mobile working machines and a method for controlling this powershift transmission. In this context, hydraulic motors are used which are connected to one another via a clutch. In a lower speed range, the hydraulic motors are connected together in a torque-adding fashion. One of the hydraulic motors is reconfigured by a further clutch so that the hydraulic motors can be operated in an adding fashion in an upper speed range rotational speed.

WO 2013/064371 A1 describes a powershift transmission with an input shaft and an output shaft which is arranged coaxially with respect thereto. The powershift transmission has a planetary gear set. The planetary gear set comprises a planet carrier which is connected to the input shaft. The first output shaft can be connected to the output-side sun of a multi-step planetary set by a shift element. The first output shaft can be connected directly to the input shaft by a second shift element. The input-side sun gear of the multi-step planetary set is connected in a rotationally fixed fashion to a housing part of the powershift transmission.

Thus, there is a need for a powershift transmission which can be embodied on the one hand with a high number of gear variants with a simultaneously compact size, and which, on the other hand, can be used for a wide application range.

SUMMARY

In the present disclosure, a powershift transmission has a transmission housing, an input shaft and an output shaft unit or assembly, wherein the input shaft and the output shaft unit extend within the transmission housing at least in certain sections, wherein an auxiliary shaft is arranged with a parallel offset between the input shaft and the output shaft unit within the transmission housing, wherein the input shaft and the auxiliary shaft are connected to one another via a front-mounted range unit, and the auxiliary shaft and the output shaft unit are connected to one another via a rear-mounted range unit, wherein each range unit has at least two individual gear wheel pairs which can be coupled and decoupled, and wherein the output shaft unit is formed from a main output shaft and an auxiliary output shaft which can be connected to one another via a reduction gear unit.

Within the scope of this present disclosure, the terms coupling and decoupling of the individual gear wheel pairs mean that the gear wheel pairs are either in engagement with one another and then a torque can be transmitted from the one gear wheel to the other gear wheel of the gear wheel pair or that the gear wheels of a gear wheel pair are not in engagement with one another. When two gear wheels are in engagement with one another, the gear wheel pair is therefore a coupled one.

The powershift transmission can be connected to a drive machine, for example, an internal combustion engine, via the input shaft so that the torque which is fed in can be transmitted to the output shaft unit via the powershift transmission. A working machine or a drive shaft, for example, for wheels can then be connected to the output shaft unit. In one embodiment, this takes place via the main output shaft.

Overall, the powershift transmission has two range units and a reduction gear unit. A reduction gear unit is an extension of the manual transmission. The latter is usually composed of two reduction-gear-unit gear wheel pairs. These reduction-gear-unit gear wheel pairs can be connected to one another in a variety of ways and implement either a gear reduction or a transmission, at least in a shifted state. Finally, with the reduction gear unit it is thus possible to implement two shifted states, wherein one shifted state is provided for a low load state, and another shifted state is provided for a high load state. For this reason, the shifted states of the reduction gear unit are generally denoted by Hi (high) for the high load state and by Lo (low) for the low load state.

A multiplicity of individual gearshift variants can be implemented by means of the reduction gear unit and the front-mounted range unit and the rear-mounted range unit, each with at least two gear wheel pairs and correspondingly at least two shifted states. The front-mounted range unit permits in this context the transmission of a torque between the input shaft and the auxiliary shaft, the rear-mounted range unit permits the transmission of torque between the auxiliary shaft and the output shaft unit, and the front-mounted range unit permits the transmission of torque between the main output shaft and the auxiliary output shaft.

Accordingly, the maximum number of gearshift variants results from a multiplication of the number of gear wheel pairs of the front-mounted range unit, the number of gear wheel pairs of the rear-mounted range unit and the number of shifted states of the reduction gear unit. When there are at least two gear wheel pairs in the front-mounted range unit and in the rear-mounted range unit, and two shifted states in the reduction gear unit a maximum number of eight gearshift variants thus results. However, this number of gears can be increased in an easy way in that further gear wheel pairs are added in the front-mounted range unit or in the rear-mounted range unit.

An increase in a further gear wheel pair already gives rise to an additional four gearshift variants. Therefore, a multiplicity of different gearshift variants can be obtained by means of minor structural modifications so that the power transmission can be adapted individually depending on the application or depending on the type of agricultural machine. However, for this purpose, the transmission housing and also the shafts which are present can usually be retained, since the additional installation of gear wheel pairs does not require a change to this effect.

This is due, inter alia, to the fact that even with relatively few gear wheel pairs it is possible to obtain a large number of gearshift variants, and as a result of this low number of gear wheel pairs only a small number of clutches have to be correspondingly provided. In the case of a powershift transmission, a separate clutch has to be provided for each gear wheel pair of the front-mounted range unit and of the rear-mounted range unit. Through the use of a reduction gear unit, it is possible to reduce the number of clutches particularly in the case of high gearshift variants, wherein the reduction gear unit also requires at least two clutches.

In the case of an exemplary embodiment with 32 gearshift variants, both the front-mounted range unit and the rear-mounted range unit have four gear wheel pairs each. Accordingly, ten clutches are necessary to implement such a powershift transmission. As far as the reduction gear unit has been dispensed with, the same number of gearshift variants could be obtained, for example, by virtue of the fact that eight gear wheel pairs are provided for the front-mounted range unit and twelve gear wheel pairs are provided for the rear-mounted range unit. Therefore, a total of twelve clutches may be necessary. In comparison, in the case of a powershift transmission according to the present disclosure it is possible to dispense overall with two clutches. As a result, it is possible for the overall size of the power transmission to be kept very compact. Moreover, within the transmission housing there is sufficient installation space available since the gear wheel pairs are permitted to be easily increased or reduced.

The gear wheel pairs each have a drive gear wheel and an output gear wheel, wherein the torque is transmitted from the drive gear wheel to the output gear wheel. In one embodiment, the drive gear wheels of the front-mounted range unit are arranged on the input shaft, and the output gear wheels of the front-mounted range unit are arranged on the auxiliary shaft. Accordingly, the drive gear wheels of the rear-mounted range unit are arranged on the auxiliary shaft, and the output gear wheels of the rear-mounted range unit are arranged on the auxiliary output shaft.

As a result, it becomes clear that the reduction gear unit is arranged downstream of the front-mounted range unit and the rear-mounted range unit. This has the advantage that the gear wheel pairs of the front-mounted range unit and the rear-mounted range unit always rotate in the same direction independently of the shift operation of the reduction gear unit, so that an optimized gear tooth arrangement is always possible between the input shaft and the auxiliary shaft, on the one hand, and between the auxiliary shaft and the auxiliary output shaft, on the other hand. In addition, the gear wheels on the input shaft or the gearwheels of the auxiliary shaft can also be easily used to operate additional drive units. Such drive units can be, for example, pumps, compressors or water pumps.

In a further embodiment, a reversing unit is integrated into the reduction gear unit. The purpose of this reversing unit is to reverse the direction of rotation of the shafts connected downstream of the reversing unit so that reversing is possible, for example, in the case of an agricultural machine. In such an embodiment, integrating this reversing unit into the reduction gear unit makes it possible to dispense with a load change. Instead of a reversing unit, it is also possible to connect a so-called power reverser upstream.

Within the scope of the present disclosure, in particular two alternatives have proven particularly advantageous for the embodiment of the reduction gear unit. Here it is intended that both alternatives implement the reduction gear unit by a first and a second reduction-gear-unit gear wheel pair.

According to a first alternative embodiment, in a first shifted state of the reduction gear unit the auxiliary output shaft is coupled directly to the main output shaft, and in a second shifted state of the reduction gear unit the auxiliary output shaft is connected to the main output shaft via the first and second reduction-gear-unit gear wheel pair. Therefore, in the first shifted state there is no step-up or step-down transmission that occurs via the two gear wheel pairs but rather the main output shaft and the auxiliary output shaft are directly connected to one another via a clutch. The two reduction-gear-unit gear wheel pairs are correspondingly not in engagement with one another. Insofar as there is a change into the second shifted state, a "doubled" step-up or step-down transmission occurs via the two reduction-gear-unit gear wheel pairs. In the case of a step-up transmission, the first shifted state constitutes the high load state Hi, and the second shifted state constitutes the low load state Lo. Accordingly, in the case of a step-down transmission the first shifted state is the low load state Lo, and the second shifted state is the high load state Hi.

In this embodiment, it is usually also referred to as a three-shaft arrangement since the main output shaft and the auxiliary output shaft are arranged coaxially one next to the other, so that a direct coupling is easily possible. Both output shafts have the same direction of rotation here independently of the shifted state. Therefore, a reversal of the direction of rotation occurs, on the one hand, between the input shaft and the auxiliary shaft and, on the other hand, between the auxiliary shaft and the output shaft unit. Correspondingly, the input unit and the output shaft have the same direction of rotation.

According to a second embodiment, the direction of rotation of the main output shaft can be reversed in comparison with the direction of rotation of the input shaft. This takes place in that in a first shifted state of the reduction gear unit the auxiliary output shaft is connected to the main output shaft via the first reduction-gear-unit gear wheel pair or in a second shifted state of the reduction gear unit the auxiliary output shaft is connected to the main output shaft via the second reduction-gear-unit gear wheel pair. Thus, a reversal of the direction of rotation therefore takes place between the output shafts. Such an embodiment is therefore also referred to as a four-shaft arrangement. One of the reduction-gear-unit gear wheel pairs here has a stepped-up transmission and the other reduction-gear-unit gear wheel pair has a stepped-down transmission. However, it is also possible for a reduction-gear-unit gear wheel pair to be embodied in such a way that neither a step-up nor a step-down transmission occurs so that merely the direction of rotation is reversed.

As explained above, each gear wheel pair of the front-mounted range unit and of the rear-mounted range unit has its own clutch. There are also two additional clutches for the reduction gear unit. The actuation of these clutches occurs via a hydraulic actuation arrangement. A further advantage of this present disclosure is that the hydraulic actuation arrangement is always identical irrespective of the number of gear wheel pairs or of the gearshift variants, so that even in the case of subsequent adaptation there is no need to change the hydraulic actuation arrangement.

Basically, a multiplicity of different gearshift variants can be implemented, wherein the front-mounted range unit or the rear-mounted range unit have four gear wheel pairs.

The subject matter of the present disclosure is also a method for running through a powershift transmission, wherein the front-mounted range unit defines a first shift level, the rear-mounted range unit defines a second shift level and the reduction gear unit defines a third shift level, wherein each shift level has at least two shifted states, and wherein the second shift level is arranged downstream with respect to the first shift level, and the third shift level is arranged downstream with respect to the second shift level.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 4 shows a shifting principle of the powershift transmission according to the present disclosure.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
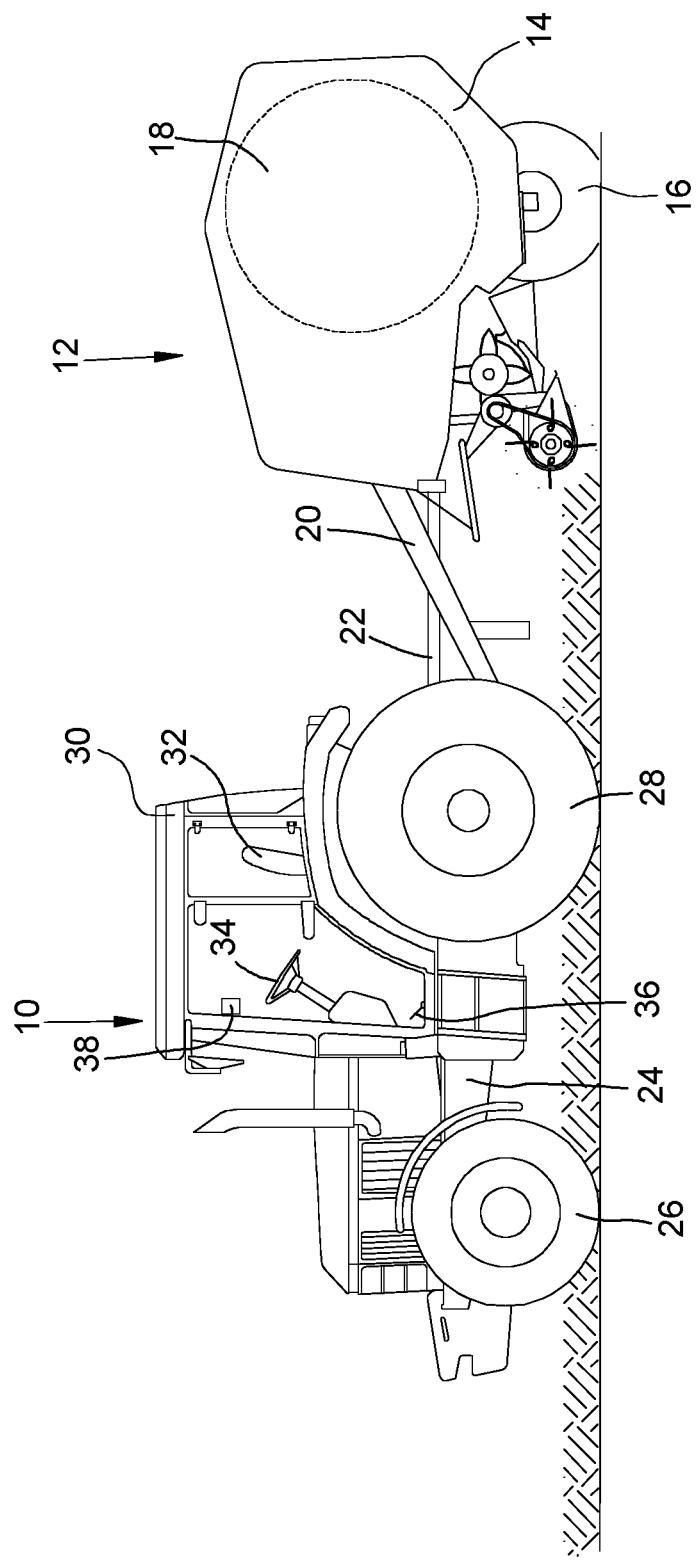
FIG. 1 shows a schematic illustration of an agricultural working machine.

FIG. 1 shows an agricultural working machine in the form of a tractor 10 and any desired implement 12 which is towed by the tractor and is embodied, for example, as a round bale press. The implement 12 comprises a chassis 14 which is supported on wheels 16 and has a bale-forming chamber 18. The implement 12 is towed by the tractor 10 via a drawbar 20. The driveable elements of said drawbar 20 are driven by the tractor 10 by means of a power take-off shaft 22.

The tractor 10 comprises a chassis 24 which is supported on front, steerable wheels 26 and driven wheels 28 at the rear. An operator workstation with a seat 32 is located in a cab 30. A steering wheel 34, an accelerator pedal 36, an operator position 38, and other controls can be activated from the seat.

Figure 2:
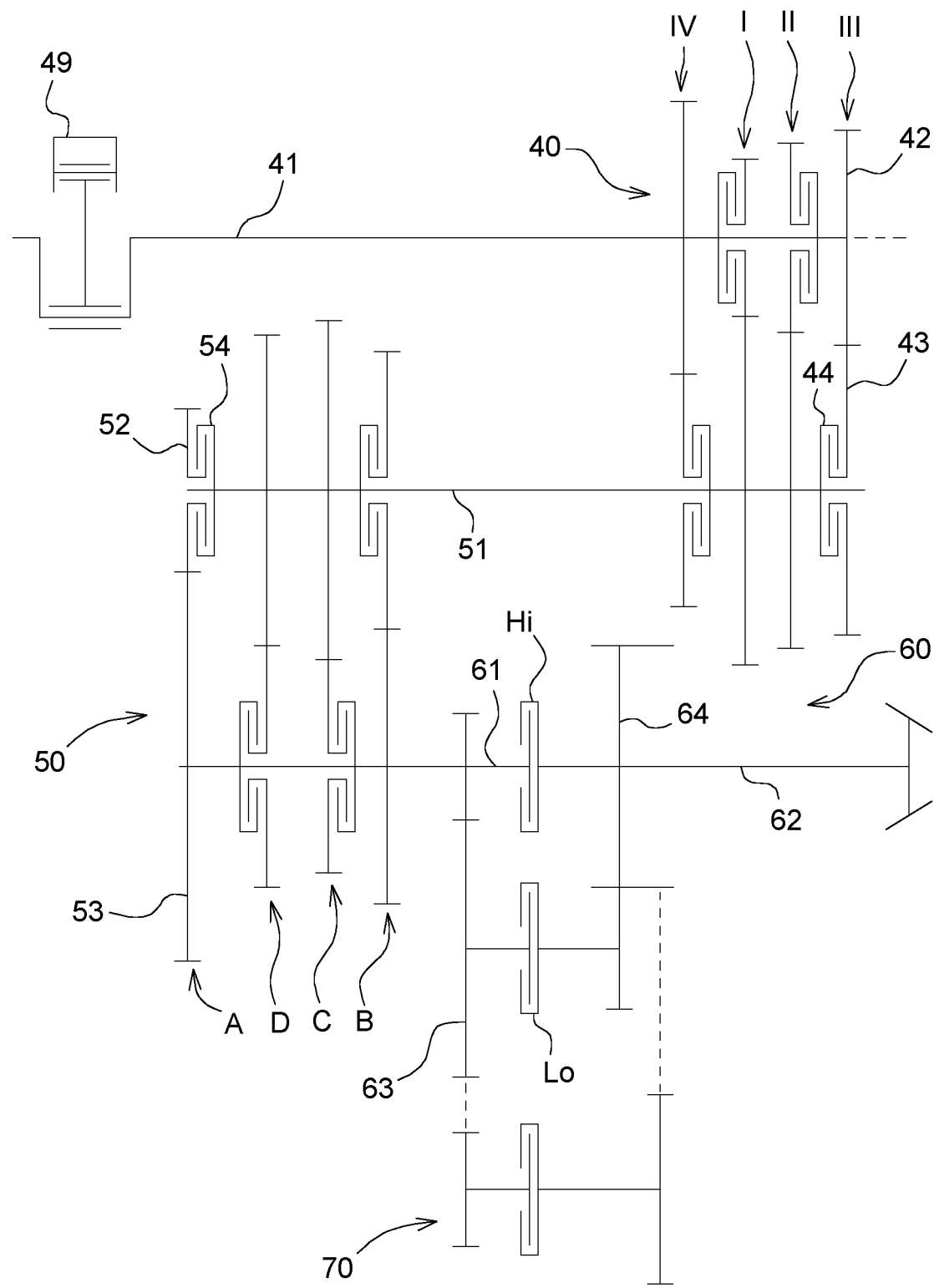
FIG. 2 shows a powershift transmission according to the present disclosure with 32 gearshift variants.

FIG. 2 shows a schematic diagram of the powershift transmission according to the present disclosure. The powershift transmission has an input shaft 41 and an output shaft unit or assembly including an auxiliary output shaft 61 and a main output shaft 62, wherein an auxiliary shaft 51 is arranged with a parallel offset between the input shaft 41 and the output shaft unit or assembly. A drive machine 49, which transmits a torque to the input shaft 41, is provided on the input shaft 41. This torque is transmitted by the input shaft 41 to the auxiliary shaft 51 via a front-mounted range unit 40, wherein in turn a torque transmission between the auxiliary shaft and the auxiliary output shaft 61 occurs via the rear-mounted range unit 50.

In the exemplary embodiment which is shown by way of example, the front-mounted range unit 40 has a total of four gear wheel pairs I, II, III and IV, each composed of a drive gear wheel 42 and an output gear wheel 43, which can be engaged with one another via a clutch 44. These four gear wheel pairs I, II, III and IV are distinguished by different transmission ratios. For example, the gear wheel pair I has a relatively small drive gear wheel 42 and a large output gear wheel 43. As long as these gear wheels are in engagement with one another, the rotational speed of the output gear wheel 43 is reduced and at the same time the torque is increased. In comparison with this, the gear wheel pair IV has a relatively large drive gear wheel 42 and a relatively small output gear wheel 43, as a result of which the rotational speed of the output gear wheel 43 is increased and the torque is reduced.

In order to transmit the torque from the input shaft 41 to the auxiliary shaft 51, the drive gear wheels 42 of the front-mounted range unit 40 are arranged on the input shaft 41 and the output gear wheels 43 are arranged on the auxiliary shaft 51. In each case, two of the clutches 44 of the gear wheel pairs I, II, III and IV are in this case arranged on the input shaft 41 and the other two clutches 44 are arranged on the auxiliary shaft 51. As a result, the installation space can be kept as small as possible in the direction of the axis of rotation of the input shaft 41 and the auxiliary shaft 51.

However, embodiments are also possible in which all of the clutches 44 are arranged exclusively on the input shaft 41 or on the auxiliary shaft 51.

The transmission of the torque from the auxiliary shaft 51 to the output shaft unit takes place via a rear-mounted range unit 50. For this purpose, the drive gear wheels 52 are arranged on the auxiliary shaft 51 and the output gear wheels 53 are arranged on the auxiliary output shaft 61.

The individual gear wheel pairs A, B, C and D of the rear-mounted range unit 50 can also be coupled and decoupled by means of respectively assigned clutches 54, wherein in the example shown two of the clutches 54 are arranged on the auxiliary shaft 51 and the other two clutches 54 are arranged on the auxiliary output shaft 61. Here, too, the clutches 54 can be arranged exclusively on the auxiliary shaft 51 or the auxiliary output shaft 61.

Arranged between the auxiliary output shaft 61 and the main output shaft 62 is a reduction gear unit 60, via which the auxiliary output shaft 61 is connected to the main output shaft 62. The reduction gear unit 60 has a clutch Hi, via which the auxiliary output shaft 61 can be directly coupled to the main output shaft 62. For this purpose, the two output shafts 61, 62 are arranged one next to the other and coaxially with respect to one another, wherein the clutch Hi permits direct transmission of the torque, so that both the transmitted torque and the rotational speed remain unchanged after engagement of the clutch. Such a connection constitutes a first shifted state of the reduction gear unit 60, which state describes a high load state.

In a second shifted state of the reduction gear unit 60, the auxiliary output shaft 61 is connected to the main output shaft 62 via a first and a second reduction-gear-unit gear wheel pair 63, 64. There, the output gear wheel of the first reduction-gear-unit gear wheel pair 63 can be coupled to the drive gear wheel of the second reduction-gear-unit gear wheel pair 64 via a clutch Lo. The drive gear wheel of the first reduction-gear-unit gear wheel pair 63 is arranged here on the auxiliary output shaft 61, and the output gear wheel of the second reduction-gear-unit gear wheel pair 64 is arranged on the main output shaft 62. Both reduction-gear-unit gear wheel pairs 63, 64 are embodied here in such a way that a transmission of a reduction of the rotational speed and an increase in the torque takes place. The second shifted state defines a low load state.

Irrespective of the shifted state of the reduction gear unit 60, the auxiliary shafts 61, 62 always have the same direction of rotation, which is unchanged in comparison with the direction of rotation of the input shaft 41.

The number of gearshift variants results now from a multiplication of the gear wheel pairs of the front-mounted range unit 40, of the rear-mounted range unit 50 and the shifted states of the reduction gear unit 60. Therefore, a total of 32 gears can be implemented. Removing, for example, the gear wheel pair IV and the gear wheel pair D causes the number of gearshift variants to be reduced to only 18.

Moreover, the powershift transmission has a reversing unit 70 which is integrated into the reduction gear unit 60.

Figure 3:
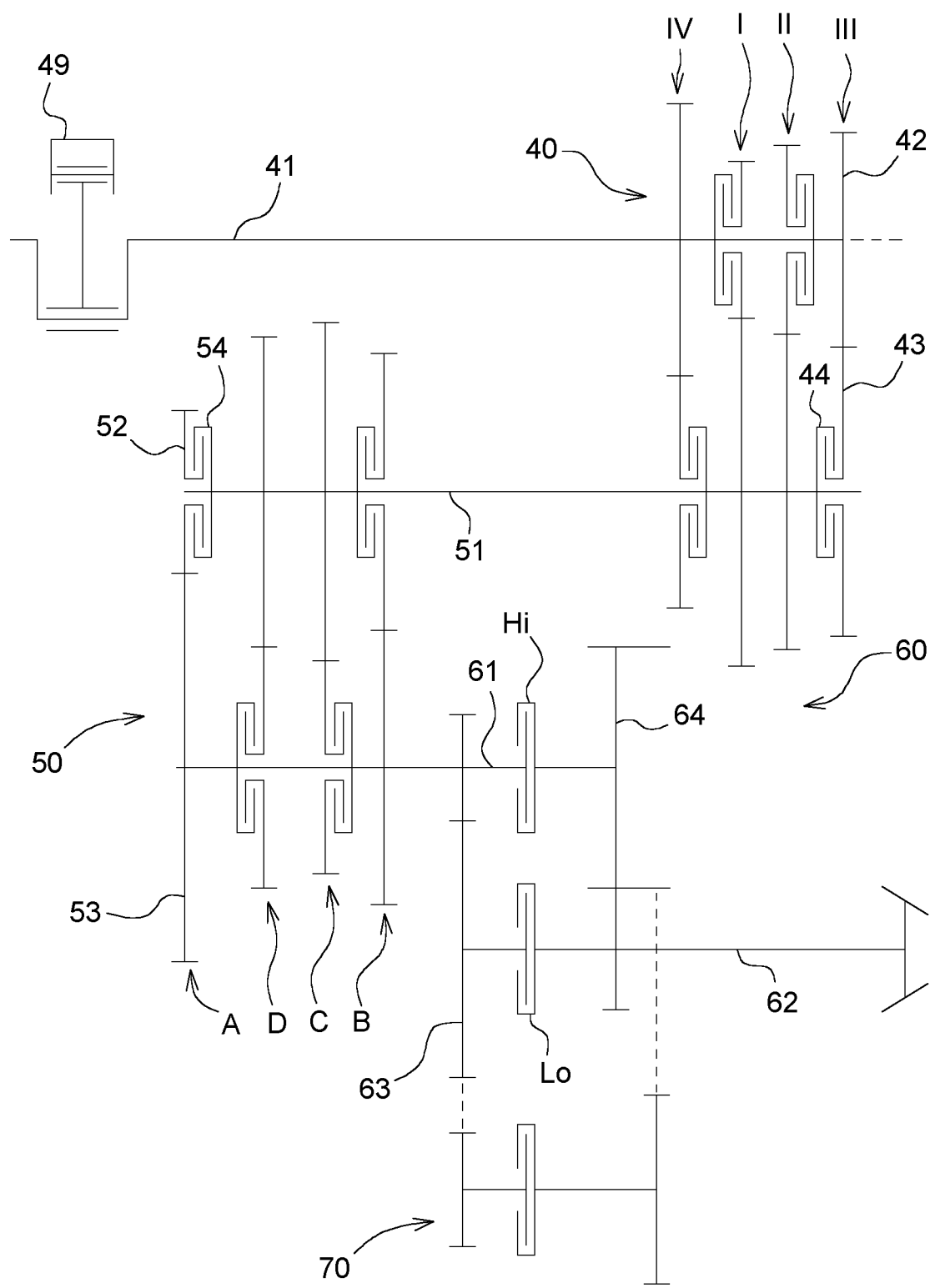
FIG. 3 shows an alternative embodiment of the powershift transmission according to FIG. 2.

FIG. 3 shows an alternative embodiment of the powershift transmission according to FIG. 2, which differs in the embodiment of the reduction gear unit 60. In contrast to FIG. 2, the output shafts 61, 62 cannot be coupled directly to one another. Instead, a first shifted state is implemented by means of the first reduction-gear-unit gear wheel pair 63, and a second shifted state is implemented by means of the second reduction-gear-unit gear wheel pair 64. The first reduction-gear-unit gear wheel pair 63 can be coupled in here by the clutch Lo and defines a low load state, while the second reduction-gear-unit gear wheel pair 64 is coupled by the clutch Hi and defines a high load state. The other components are embodied in a way analogous to the powershift transmission according to FIG. 2. In particular, the front-mounted range unit 40 also has four gear wheel pairs I, II, III and IV here, and also the rear-mounted range unit 50 has four gear wheel pairs A, B, C and D.

The essential difference with respect to the powershift transmission according to FIG. 2 is that a reversal of the direction of rotation takes place between the auxiliary output shaft 61 and the main output shaft 62. Overall, a reversal of the direction of rotation takes place via the front-mounted range unit 40, the rear-mounted range unit 50 and the reduction gear unit 60, so that the main output shaft 62 has a direction of rotation which is reversed in comparison with the input shaft 41. In one embodiment according to FIG. 2, the input shaft 41 and the main output shaft 62 have the same direction of rotation.

FIG. 4 shows a shift principle of the powershift transmission. It is shown how the powershift transmission is to run through, in order to be able to change over as continuously as possible from a low gearshift variant into a high gearshift variant. In this context, the front-mounted range unit 40 forms a first shift level, the rear-mounted range unit 50 forms a second shift level, and the reduction gear unit 60 forms a third shift level.

At first, the front-mounted range unit 40 is placed onto the gear wheel pair I, the rear-mounted range unit 50 is placed onto the gear wheel pair A and the reduction gear unit 60 is placed in the shifted state Lo. In order to increase the gear, the front-mounted range unit 40 is now firstly run through, while both the rear-mounted range unit 50 and the reduction gear unit 60 remain unchanged. In order to bring about a further increase, this operation is repeated in the case of a successively shifted increase in the rear-mounted range unit 50, until all the gear wheel pairs A, B, C and D of the rear-mounted range unit 50 have been run through.

In a further step, the reduction gear unit 60 is then placed in the switched state Hi and the shifting principle explained above is repeated.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A powershift transmission for an agricultural machine, comprising:
   an input shaft;
   an auxiliary shaft;
   an auxiliary output shaft arranged parallel and offset between the input shaft and the auxiliary shaft;
   a main output shaft arranged next to and coaxial with the auxiliary output shaft;
   a front-mounted range unit including at least two individual gear wheel pairs connecting the input shaft and the auxiliary shaft, the at least two individual gear wheel pairs being coupled or decoupled;
   a rear-mounted range unit including at least two individual gear wheel pairs connecting the auxiliary shaft and the auxiliary output shaft, the at least two individual gear wheel pairs being coupled or decoupled; and a reduction gear unit connecting the auxiliary output shaft and the main output shaft, the reduction gear unit including a first reduction-gear-unit gear wheel pair and a second reduction-gear-unit gear wheel pair;

wherein in a first shifted state of the reduction gear unit, the auxiliary output shaft is coupled directly to the main output shaft so that both transmitted torque and rotational speed remain unchanged between the auxiliary output shaft and the main output shaft;

wherein in a second shifted state of the reduction gear unit, the auxiliary output shaft is connected to the main output shaft via the first reduction-gear-unit gear wheel pair and the second reduction-gear-unit gear wheel pair so that transmitted torque increases and rotational speed decreases; and wherein in the first shifted state and the second shifted state of the reduction gear unit, the input shaft, the auxiliary output shaft, and the main output shaft have the same direction of rotation.

2. The powershift transmission of claim 1, wherein the at least two individual gear wheel pairs of the front-mounted range unit includes four gear wheel pairs connecting the input shaft and the auxiliary shaft, and the at least two individual gear wheel pairs of the rear-mounted range unit includes four gear wheel pairs connecting the auxiliary shaft and the auxiliary output shaft.

3. The powershift transmission of claim 2, wherein the powershift transmission includes thirty-two gearshift variants.

4. The powershift transmission of claim 1, wherein the front-mounted range unit defines a first shift level, the rear-mounted range unit defines a second shift level, and the reduction gear unit defines a third shift level;

wherein the front-mounted range unit includes four shifted states, the rear-mounted range unit includes four shifted states, and the reduction gear unit includes two shifted states; and wherein the second shift level is arranged downstream of the first shift level, and the third shift level is arranged downstream of the second shift level.

5. The powershift transmission of claim 1, wherein the rotational direction of the main output shaft is reversible by a reversing unit.

6. The powershift transmission of claim 5, wherein the reversing unit is integrated into the reduction gear unit.

* * * * *